(12) United States Patent
Gusek et al.

(10) Patent No.: US 11,701,610 B2
(45) Date of Patent: Jul. 18, 2023

(54) AMBIENT AIR PURIFYING DEVICE AND USE OF A FILTER ELEMENT IN AN AMBIENT AIR PURIFYING DEVICE

(71) Applicant: MANN+HUMMEL GmbH, Ludwigsburg (DE)

(72) Inventors: Jens Gusek, Freudental (DE); Marc Hittinger, Reutlingen (DE); Christoph Schulz, Stuttgart (DE); Maximilian Bauch, Boennigheim (DE)

(73) Assignee: MANN+HUMMEL Life Sciences & Environment Holding Singapore Pte. Ltd., Singapore (SG)

( * ) Notice: Subject to any disclaimer, the term of this patent is extended or adjusted under 35 U.S.C. 154(b) by 250 days.

(21) Appl. No.: 17/370,146

(22) Filed: Jul. 8, 2021

(65) Prior Publication Data
US 2022/0008859 A1 Jan. 13, 2022

(30) Foreign Application Priority Data

Jul. 10, 2020 (DE) ...................... 10 2020 118 293.7

(51) Int. Cl.
*B01D 46/42* (2006.01)
*B01D 46/121* (2022.01)
(Continued)

(52) U.S. Cl.
CPC ..... *B01D 46/4227* (2013.01); *B01D 46/0005* (2013.01); *B01D 46/0043* (2013.01);
(Continued)

(58) Field of Classification Search
CPC .. B01D 46/121; B01D 46/4227; B01D 46/88; B01D 46/90; B01D 46/0004;
(Continued)

(56) References Cited

U.S. PATENT DOCUMENTS 6,485,538 B1 11/2002 Toyoshima
2004/0144254 A1 7/2004 Wiser, III et al.

FOREIGN PATENT DOCUMENTS

DE 102010053758 A1 6/2012
DE 102018129286 B3 8/2019
(Continued)

OTHER PUBLICATIONS

Machine translation of KR 101908648 (Year: 2018).*

*Primary Examiner* — Robert Clemente

(57) ABSTRACT

An ambient air purifying device has a blower housing with air inlet and air outlet. In the blower housing, a flow generating device is arranged generating an air flow from air inlet to air outlet. Between air inlet and air outlet, a filter device is arranged with filter elements arranged relative to each other in a V shape. The blower housing has a servicing door through which the blower housing interior is accessible. The filter device has a filter element support held at the blower housing and supporting the filter elements. The filter element support is pivotably supported about an axis at the blower housing. The filter element support is transferrable from an operating state, in which it is completely inside the blower housing, into a servicing state, in which it projects at least partially through the servicing door from the blower housing, by pivoting about the axis.

21 Claims, 10 Drawing Sheets

(51) Int. Cl.
  *B01D 46/00* (2022.01)
  *B01D 46/52* (2006.01)
  *B01D 46/88* (2022.01)

(52) U.S. Cl.
  CPC ......... *B01D 46/121* (2022.01); *B01D 46/521* (2013.01); *B01D 46/88* (2022.01); *B01D 2265/021* (2013.01); *B01D 2273/30* (2013.01)

(58) Field of Classification Search
  CPC .............. B01D 46/0005; B01D 46/521; B01D 2273/30; B01D 2265/021; B01D 2265/026; B01D 46/0043
  See application file for complete search history.

(56) References Cited

FOREIGN PATENT DOCUMENTS

| | | | |
|---|---|---|---|
| EP | 1189675 | A1 | 3/2002 |
| JP | H1133331 | A | 2/1999 |
| KR | 101908648 | B1 * | 10/2018 |
| WO | 2008045325 | A2 | 4/2008 |

* cited by examiner

AMBIENT AIR PURIFYING DEVICE AND USE OF A FILTER ELEMENT IN AN AMBIENT AIR PURIFYING DEVICE

BACKGROUND OF THE INVENTION

The invention concerns an ambient air purifying device, in particular for stationary ambient air filtration in the outdoor and/or indoor space, as well as a use of the filter element in an ambient air purifying device.

Worldwide, in many metropolitan areas there is the problem that the ambient air can surpass many times over the limit values for particulate matter and/or gases such as ozone, NOR, CO due to industrial exhaust gases, the traffic, and private fireplaces, primarily in adverse weather conditions (no rain, inversion, minimal wind speeds, no air exchange between altitude layers). Measures that lead to a reduction of the pollutant concentrations can reside either in avoiding or reducing emissions and/or the separation of these pollutants from the ambient air.

The same problem is also present in indoor spaces in which by emission sources in the indoor space itself, persons as well as pollutant introductions from the exterior, there is a need to purify the air.

A concept that is already documented in the prior art is using stationarily mounted ambient air purifiers for separation of airborne pollutants. Such devices comprise in general a housing that can be flowed through, provided with an inlet and an outlet, in which one or a plurality of blowers and a filter are arranged, wherein the filters can be conventional filter elements of porous, air-permeable filter media and/or electrostatic separators. The ambient air purifiers are installed advantageously at locations with increased pollutant concentration, for example, in the outdoor space as well as in indoor spaces, tunnels, subterranean train stations, bus stops etc.

Ambient air purifiers of the aforementioned kind are disclosed, for example, in FR 27 87 175 A or US 2019/0160411 A.

In order to be able to realize a filter surface area as large as possible and thus a great separation capacity as well as a minimal pressure loss, in such ambient air purifiers flat filter bellows are frequently used in practice that are connected parallel in fluid communication and arranged in a V configuration relative to each other. These filters that are referred to also as V-cell filters comprise 4 to 10 individual bellows and can have a significant weight of more than 20 kg. This is disclosed inter alia in DE 10 2018 129 286 B3.

The aforementioned ambient air purifying devices according to the prior art have the disadvantage that servicing (exchange of the filter elements) is possible only with increased expenditure. Either the servicing process is not satisfactory due to ergonomic considerations (weight of the filters too high) or the accessibility of the filter elements in the interior is limited (increased service duration).

SUMMARY

Based on this prior art, the invention has therefore the object to provide an ambient air purifying device that is optimized in respect to a servicing aspect.

Moreover, there is the object of providing a use of a filter element in an ambient air purifying device that prevents faulty mounting of the filter element.

The object is solved by an ambient air purifying device, in particular for stationary ambient air filtration in the indoor and/or outdoor space, comprising a blower housing that comprises at least one air inlet and at least one air outlet, wherein in the blower housing at least one air flow generating device is arranged by means of which an air flow from the air inlet to the air outlet can be generated, wherein moreover in the blower housing, between the air inlet and the air outlet in regard to flow, a filter device is present which comprises a plurality of filter elements arranged in a V shape relative to each other, wherein the blower housing comprises at least one servicing door through which an interior of the blower housing is accessible and in that the filter device comprises a filter element support held at the blower housing that supports the filter elements that are arranged in a V shape relative to each other, wherein the filter element support is transferable from an operating state, in which it is completely present inside the blower housing, into a servicing state, in which the filter element support projects at least partially through the servicing door from the blower housing, wherein the filter element support is pivotably supported about at least one axis in relation to the blower housing and the transfer of the filter element support from the operating state into the servicing state and vice versa comprises a pivoting about the axis.

The object is further solved by a method of using a filter element comprising a folded bellows of folded filter medium and a frame that surrounds the folded bellows circumferentially, wherein the frame comprises at least one cut that extends from an upper and/or a lower rim and is present between two neighboring folds, in an ambient air purifying device, preferably in an ambient air purifying device as claimed.

Preferred further embodiments are disclosed in the respective dependent claims.

The ambient air purifying device according to the invention is in particular configured for stationary ambient air filtration in the indoor and/or outdoor space. It can be configured as a so-called outdoor air purifier or as an indoor air purifier. In an embodiment as an outdoor air purifier, the latter can be provided to be installed in the public outdoor space, for example, at inner city pollutant hot spots, for example, in immediate vicinity of a roadway and/or in a tunnel. In the indoor space, the ambient air purifying device can be used everywhere where there is a need for clean room air, for example, in offices, manufacturing halls, medical facilities and/or in private rooms.

The ambient air purifying device has a blower housing that comprises at least one air inlet and at least one air outlet. In the blower housing, at least one air flow generating device is arranged by means of which an air flow from the air inlet to the air outlet can be generated, wherein moreover in the blower housing, between the air inlet and the air outlet in regard to flow, a filter device is present that comprises a plurality of filter elements that are arranged in a V shape relative to each other. The blower housing comprises at least one servicing door through which an interior of the blower housing is accessible. The filter device comprises a filter element support that is held at the blower housing and supports the filter elements that are arranged in a V shape relative to each other. The filter element support can be transferred from an operating state in which it is present completely inside the blower housing into a servicing state in which the filter element support at least partially projects through the servicing door from the blower housing. In embodiments, the ambient air purifying device may comprise also two or more air flow generating devices of which at least two are arranged in air paths that are separate from each other.

In comparison to known filter devices, the construction of the ambient air purifying device according to the invention provides the advantage that a servicing process (exchange of the filter elements that are laden with dirt) can be realized significantly faster and more ergonomically with respect to the workflow.

In that the filter element support in the servicing state is present in a position at least partially pivoted out of the servicing door, an exchange of the filter elements by the service technician can be done without problem and easily.

In embodiments, the blower housing can comprise, for example, a cuboidal, in particular cubic, configuration. However, it can also have a configuration that is deviating therefrom, for example, with a circular or elliptical base surface.

In further embodiments, the blower housing can comprise at least one grid that spans at least partially across the air inlet and/or the air outlet. The grid provides an ingress protection and retains coarse dirt which otherwise could damage the device for generating the air flow.

The device for generating the air flow can be an axial, diagonal or radial blower that can be driven by an electric motor. Other drive types that appear suitable to a person of skill in the art are possible.

For operating the electric motor, the filter device can comprise preferably an electrical connection. Preferably, the electrical connection can be realized at low voltage level. The filter device however can also comprise devices which enable a connection at medium voltage level, for example, to traction supply systems.

Moreover, the ambient air purifying device can comprise a control unit, in particular an electronic control unit, by means of which operating times and strategies can be controlled. The control unit is to be coupled to the electric motor in a manner that appears suitable to a person of skill in the art.

The filter element support is pivotably supported about at least one axis in relation to the blower housing. In addition, the filter element support can be linearly slidably supported about at least one axis. In this context, also combinations are possible; thus, the transfer of the filter element support into its servicing state can include, for example, a linear movement about more than one axis and/or a pivoting process about more than one axis.

In a further preferred embodiment, a pivot axis of the filter element support in relation to the blower housing can extend, in a predetermined operating orientation of the ambient air purifying device, in vertical and/or horizontal direction. However, also other arrangements of the pivot axis in space are possible, for example, as an arbitrary diagonal in space.

Moreover, the filter element support can be coupled by means of at least one joint with at least one rotational degree of freedom to the blower housing. All joint types which are capable of supporting the (static) loads, in particular in the servicing state, and appear suitable to a person of skill in the art can be used. The joints can comprise a slide and/or roller bearing.

According to a particularly preferred embodiment, the ambient air purifying device can comprise a locking device by means of which the filter element support can be locked in its operating state and/or its servicing state in relation to the blower housing. While locking in the operating state serves for providing a safe operation of the device and prevents, for example, rattling noises in operation as well as ensures a reliable sealing of a raw from a clean side, locking in the servicing state advantageously enables a further simplified servicing process: Since the filter element support is locked in relation to the blower housing, the servicing technician has both hands available for the mounting work.

In a particular embodiment, a first part of the locking device is present at the filter element support and a second part of the locking device is present at the blower housing.

Moreover, the locking device can comprise at least one spring-loaded locking element. The spring-loaded locking element can be designed, for example, as locking bolt and held at the filter element support in an axially slidable manner. The locking bolt as "first part" of the locking device can engage in its locked state in a corresponding recess or bore of the blower housing and, for release of the locking state, can be axially retracted so that the engagement in the blower housing-associated recess or bore is released. Alternatively, the locking element can be designed as a rotatably supported locking element that operatively interacts with a slot as a locking counter element. The rotatably supported locking element can be arranged in this context at the filter element support and the looking counter element at the blower housing, or vice versa.

Alternatively or additionally, a length extension of the plurality of filter elements arranged in a V shape relative to each other can extend in vertical direction in the predetermined operating orientation of the ambient air purifying device. In this case, one speaks of an upright arrangement of the filter elements. In other embodiments, an arrangement of the filter elements deviating therefrom is also possible, for example, an orientation of the length extensions of the filter elements in horizontal direction.

A length extension is understood as an extension direction of the filter element which coincides with the space direction in which it has its greatest dimension.

In a particularly preferred embodiment, it can be provided that the filter element support comprises a plurality of filter element inserts in which a filter element is received, respectively, so as to be removable along an insertion/removal direction. This enables the individual exchange of filter elements which is advantageous for exchange in case of partial damages as well as makes the servicing process even more ergonomic because the mass of an individual filter element to be moved is significantly lower.

Moreover, it can be provided that the filter element support comprises at least one filter element holding device which mechanically fixes at least one of the filter elements in the inserted state in relation to the filter element support. The filter element holding device can be transferred itself into a servicing state in which it is present displaced in relation to a filter element support body and serves as a pull-out aid for the filter element.

The filter element holding device can be designed, for example, as a clamping rail that is held with one end pivotably at the filter element support body and in its holding state is fastened with the other end detachably to the filter element support body. Preferably, the pivotable attachment of the clamping rail is provided at a position that is located at the bottom relative to the direction of gravity and the detachable attachment at the filter element support body at a top position in relation to the direction of gravity.

In order to transfer the filter element holding device into its servicing state, the detachable attachment is released so that the clamping rail can be pivoted relative to the filter element support body. In its servicing state, the clamping rail can be locked furthermore advantageously in a pivot position that enables utilization as a pull-out plane for the filter element. This simplifies the servicing process even further because the filter element is supported in relation to the direction of gravity due to the clamping rail acting as a pull-out plane.

Moreover, it can be provided that at least one of the filter elements comprises a folded bellows of a folded filter medium.

Alternatively or additionally, the filter element can comprise a main filter element and a prefilter element arranged upstream in flow direction, in particular a nonwoven mat, wherein the main filter element is embodied in particular with at least one folded bellows of filter medium. Alternatively or additionally, the filter element can be a filter element that corresponds at least to the particle filter class ePM10 75% according to ISO 16890. The filter element can be in particular a flat filter element whose minimum width and/or minimum length amounts to 100 mm, preferably 200 mm, even more preferred at least 300 mm. A fold height of the folded bellows can amount to at least 15 mm, preferably at least 25 mm, even more preferred at least 35 mm.

In an also particularly preferred embodiment, it can be provided that a fold length extension of the folded bellows extends parallel to the insertion/removal direction.

Moreover, at least one of the filter elements can comprise a frame that surrounds the folded bellows circumferentially wherein the frame comprises a cut which extends away from the upper or lower rim and is present between two neighboring folds.

In this context, the frame is preferably connected fluid-tightly to the end edges of the folds of the folded bellows as well as to the head edges of the folded bellows. The frame can comprise a hard plastic material component that is injection molded onto the folded bellows or, as an alternative, can comprise lateral and head tapes that are preferably formed of a nonwoven material that is air-permeable to a limited extent.

The nonwoven material is in particular a spunbond nonwoven that preferably comprises at least partially synthetic fibers.

The nonwoven material can have moreover an air permeability at 200 Pa between 200 and 3,500 l/m²s, preferably between 200 and 1,800 l/m²s. Alternatively or additionally, the nonwoven material of the frame element can comprise a thickness between 0.5 and 6 mm and/or a grammage between 100 and 500 g/m², preferably between 230 and 290 g/m².

In a likewise preferred embodiment, the filter element support in the region of at least one filter element insert can comprise at least one rib extending in the insertion/removal direction which engages the cut of the filter element and is received between two neighboring folds of the folded bellows of the filter element. The functional interaction of the rib at the filter element support and of the cut at the filter element enables an additional simplification of mounting because the rib, due to its engagement in the cut, fulfills a supporting and positioning function. Moreover, in this way a faulty mounting of the filter element can be avoided (poka yoke) and the installation of unsuitable filter elements (e.g. wrong specification) can be prevented. At the frame of the filter element, a plurality of cuts may also be provided in which respectively a corresponding rib of the filter element support can be received. The cuts can be introduced from an upper rim as well as from a lower rim into the frame.

The rib can have a length which corresponds to at least 1/10, preferably at least 1/6, particular preferred at least 1/3, of the extension of the filter element along its fold length direction.

A further embodiment provides that the blower housing comprises front and rear walls, side walls, as well as upper and lower walls that are respectively oppositely positioned to each other. The air outlet is positioned in particular at a front or rear wall and the air inlet at a side wall. Optionally, an air flow between the air inlet and the air outlet can experience at least one directional change in its main flow direction, in particular by 90°.

In yet another embodiment, it is provided that at least one of the filter elements comprises at least one particle filter medium, preferably a HEPA filter medium. The particle filter medium can comprise a spunbond nonwoven material, in particular a polyethylene terephthalate or polypropylene spunbond nonwoven material, and/or a needled nonwoven material, in particular a polypropylene or polyethylene terephthalate needled nonwoven, and/or a meltblown layer and/or a multi-component fiber material, in particular with bi-component fibers with a polypropylene/polyacrylonitrile component. When using a HEPA filter medium, the filter surface area per filter element can amount to 4-7 m² because a HEPA filter medium in general is significantly thinner than other filter media.

Alternatively or additionally, the filter element can comprise at least one adsorbent material, in particular an active carbon and/or a zeolite. The adsorbent material can serve for adsorption of predetermined pollutant gases, for example, $NO_x$, $CO$, $NH_3$ and/or odors. The adsorbent material can be in particular part of the filter medium and can be present therein as a loose fill in the form of one or a plurality of layer(s).

Alternatively or additionally, the filter element can have a polygonal, in particular cuboidal, shape.

According to yet another embodiment, the filter medium can comprise at least one further layer which is embodied as an antimicrobial and/or anti-allergenic layer that comprises at least one antimicrobial and/or anti-allergenic substance. By this measure, the ambient air quality can be improved in accordance with a further important aspect.

The antimicrobial, in particular antibacterial or biocidal, substance protects the filter medium or parts or layers thereof from being infested by microorganisms such as fungi or fungal spores, in particular molds or mold spores, bacteria or algae which may be present in living, reproductive or proliferating form, or from such microorganisms proliferating in the filter medium or growing through it.

The anti-allergenic substance can render innocuous for the human body or its immune system, for example, finest pollen particles and other allergens that cannot always be retained completely by the filter medium.

In particular zinc pyrithione can serve as antimicrobial substance. Alternatively or additionally, octa isothiazolone can be used as an antimicrobial substance. The second filter layer can contain furthermore antimicrobial substances on the basis of nanosilver. The second filter layer can also contain antimicrobial metals and metal compounds, in particular silver, copper, and aluminum compounds and/or 2-bromo-2-nitropropane-1,3-diol, further isothiazolin compounds, benzoic acid and its derivatives, benzalkonium halogenides, water-soluble coenzymes, oil-soluble coenzymes, plant extracts, antibiotics, biocidal metals, aliphatic and/or aromatic fatty acids and/or quaternary surface active agents as antimicrobial substances.

As anti-allergenic substances, in particular polyphenols, such as catechins, tannides or flavonoids, are conceivable. In particular caffeic, gallic, ellagic, tannic acid, cyanidin, procyanidin, proanthocyanidin, rutin, quercitin, resveratol can be used. Polyphenols bind preferably anti-allergenic substances so that the allergenic action can be reduced. Allergenic pollen, for example, are denatured by polyphenols. The anti-allergenic substances can comprise moreover anti-allergenic enzymes. Anti-allergenic enzymes cleave preferably allergenic proteins into smaller innocuous components.

Further preferred, it can be provided that the filter device is arranged at the suction side in relation to the air flow generating device. This reduces the operating noise level and enables a less complex sealing action of the housing because a relative vacuum in relation to the environment is present in a large portion of the housing.

Moreover, it can be provided that the filter device comprises at least four, preferably at least six, filter elements arranged in a V shape relative to each other, respectively. The filter surface area of an individual filter element amounts in this context preferably to 0.5 to 2.5 m$^2$, in particular 1.7 to 2.3 m$^2$.

This V-shaped filter element configuration has been found to be particularly advantageous for the use in a stationary ambient air purifying device because a particularly large filter surface area can be accommodated for a minimal inflow surface cross section.

The dimensions of the individual filter bellows of the V-cell elements can be configured in this context, for example, as follows:

| | |
|---|---|
| length: | 250-800 mm |
| width: | 250-600 mm |
| height: | 20-50 mm |
| fold height: | 20-50 mm |
| fold distance: | 4-12 mm |

A further aspect of the invention concerns the use of a filter element in an ambient air purifying device, preferably in an ambient air purifying device according to the invention. The filter element comprises a folded bellows of folded filter medium and a frame that surrounds the folded bellows circumferentially. The frame comprises at least one cut extending away from an upper and/or a lower rim and present between two neighboring folds.

In a preferred further embodiment of the use, a fold length extension of the folded bellows extends parallel to an insertion/removal direction of the ambient air purifying device for the filter element.

The features and feature combinations as well as their advantages that have been disclosed in relation to the ambient air purifying device are transferable likewise to the use according to the invention, and vice versa.

BRIEF DESCRIPTION OF THE DRAWINGS

Further advantages result from the following drawing description. In the drawings, embodiments of the invention are illustrated. The drawings, descriptions, and claims contain numerous features in combination. A person of skill in the art will consider the features expediently also individually and combine them to expedient further combinations.

DESCRIPTION OF PREFERRED EMBODIMENTS

Figure 1:
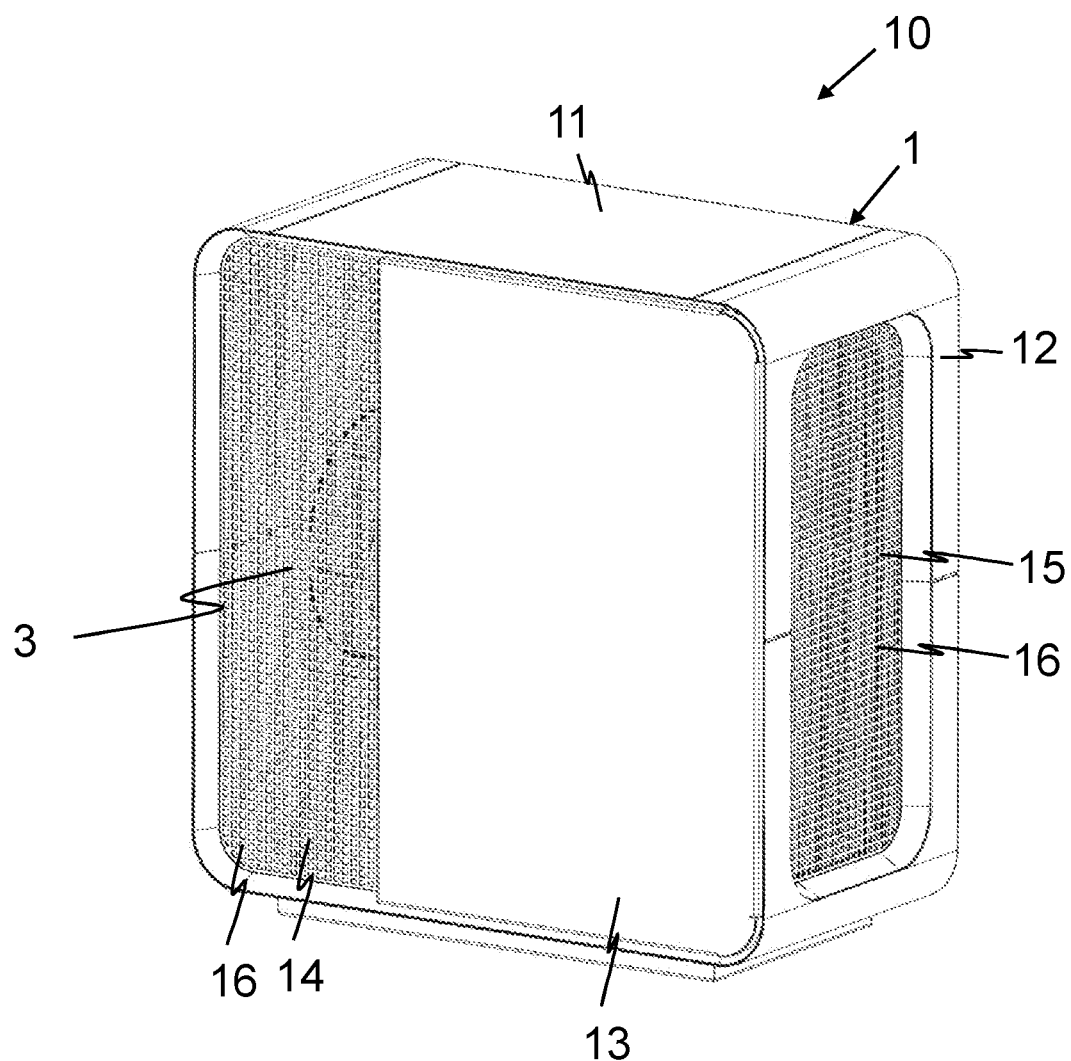
FIG. 1 shows an isometric illustration of the ambient air purifying device according to the invention.

In the Figures, same or same-type components are identified with same reference characters. The Figures show only examples and are not to be understood as limiting.

Figure 2:
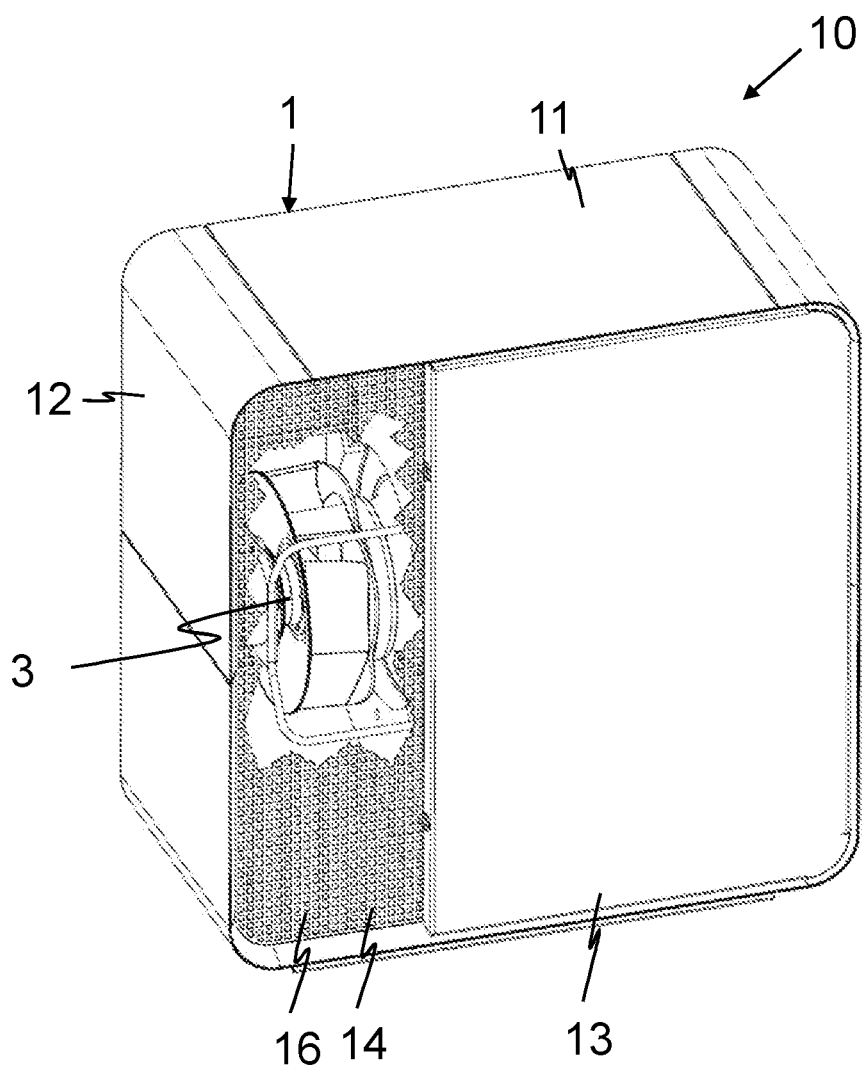
FIG. 2 shows a further isometric illustration of the ambient air purifying device according to the invention.
Figure 3:
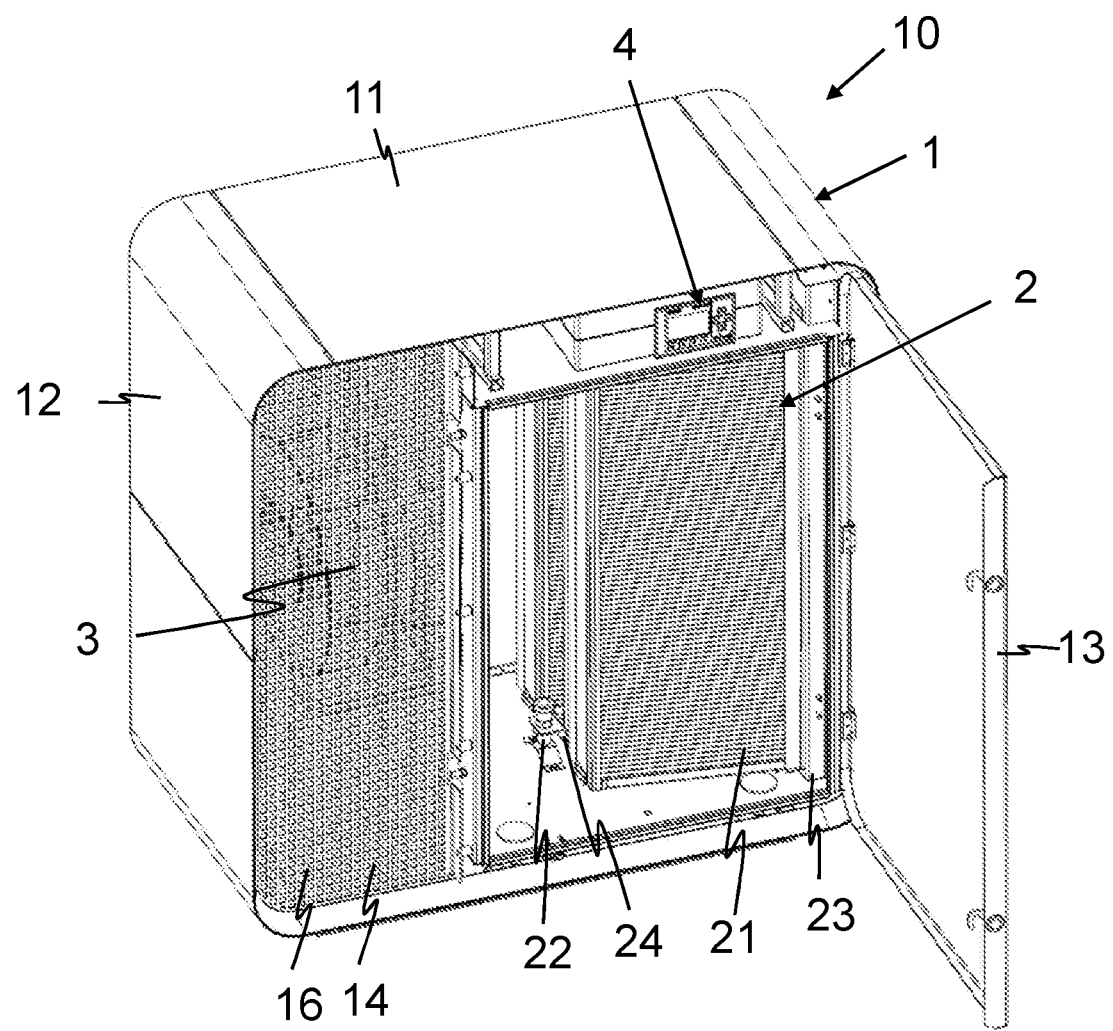
FIG. 3 shows in isometric illustration a first step of servicing the ambient air purifying device according to the invention.

The ambient air purifying device 10 according to the invention illustrated in FIG. 1 in an isometric external view comprises a blower housing 1 which comprises an air inlet 15 as well as an air outlet 14. The air inlet 15 and the air outlet 14 are each spanned across by a grid 16 which protects the interior of the blower housing 1 from ingress and keeps away other foreign bodies. The blower housing 1 has according to this embodiment a substantially cuboidal shape and comprises side walls 12 as well as an upper and a lower wall 11, respectively. The blower housing 1 comprises rounded edges that reduce the risk of injury which is in particular advantageous in case of an indoor space installation of the device according to the invention. The rounded edge portions are provided at the short edges of the cuboidal shape, respectively. The air inlet 15 is provided at a front wall and the air outlet at a side wall 12. Between the air inlet 15 and the air outlet 14 in regard to flow, a filter device 2 and an air flow generating device 3, which is embodied to produce an air flow from the air inlet 15 through the filter device 2 to the air outlet 14, are arranged in the blower housing 1 (see FIGS. 2 and 3). The ambient air purifying device 10 according to the invention comprises moreover a servicing door 13 which can be opened for servicing.

The air flow generating device 3 comprises a blower (fluid flow engine) as well as an electric motor that drives the blower. The blower can be designed as a function of the system characteristic line by a person of skill in the art, wherein in particular known configurations such as axial, diagonal, and radial blowers are conceivable.

In embodiments, the ambient air purifying device 10 comprises a control unit 4. The control unit 4 can be in particular an electronic control unit with which operating times and strategies can be controlled. The control unit 4 is to be coupled to the electric motor in a manner that appears suitable to a person of skill in the art. Alternatively, the electric motor of the air flow generating device 3 can be actuated also by a simple switch.

The servicing process for exchange of the filter elements 2 is illustrated in detail in FIGS. 3 to 6.

The filter device 2 comprises a filter element support 24 that supports a plurality of filter elements 21 in V configuration. The filter elements 21 are each received exchangeably in filter element inserts 241 of the filter element support 24. The filter element support 24 is supported pivotably by a joint 23 with a rotational degree of freedom about the vertical axis in relation to the blower housing 1. In its operating state, the filter element support 24 is arranged completely inside the blower housing 1 and is held by the locking device 22 in this position so that it cannot accidentally be displaced, which can lead to leakage and/or undesirable vibrations. The locking device 22 comprises a spring-loaded bolt which in the locked state engages a corresponding recess/bore of the blower housing 1. For release, the spring-loaded bolt is axially moved back and a pivot movement of the filter element support 24 about the axis S is released in this way.

Figure 4:
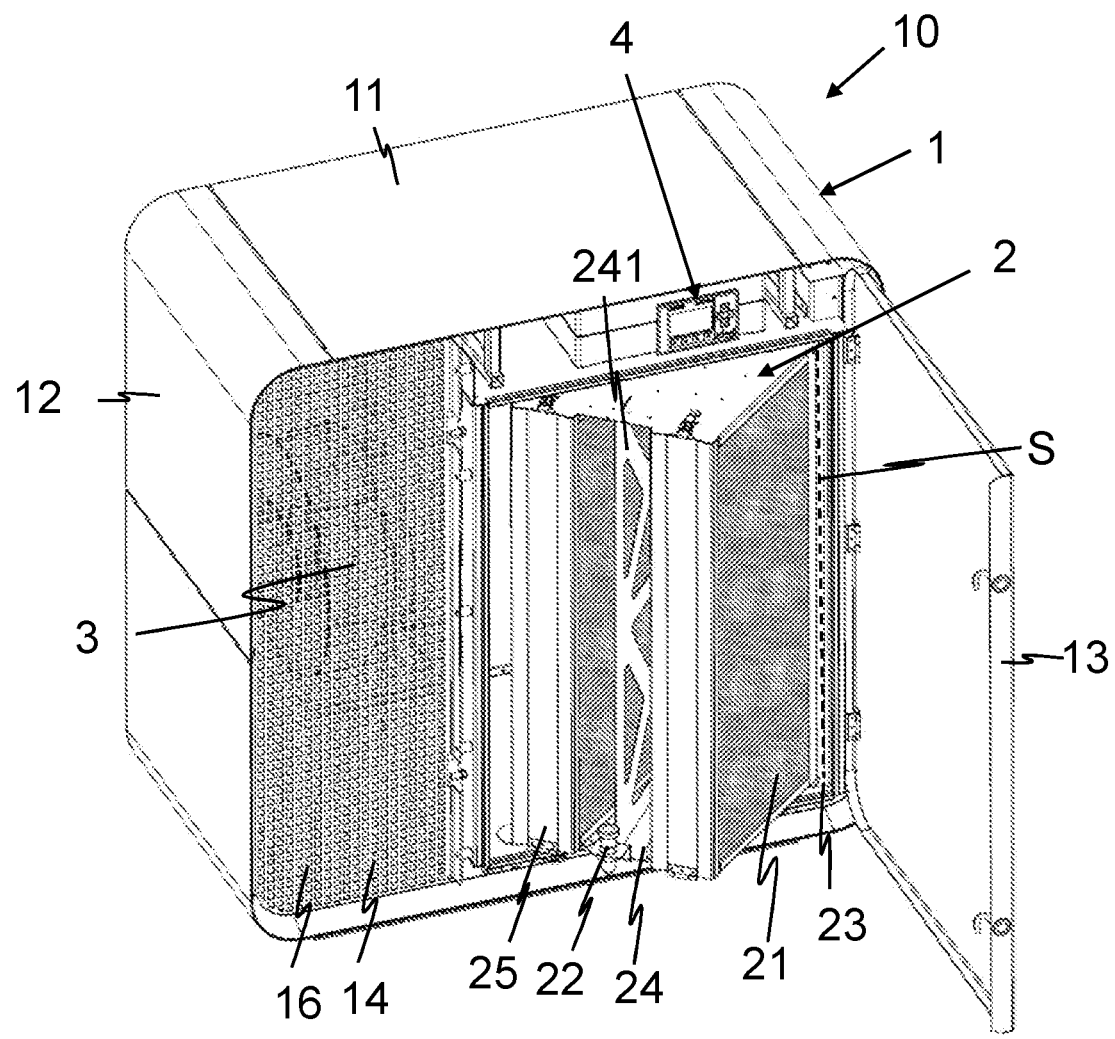
FIG. 4 shows in isometric illustration a second step of servicing the ambient air purifying device according to the invention.

By pivoting the filter element support 24 about the axis S, the filter element support 24 can be transferred into its servicing state in which it projects at least partially out of the servicing door 13 of the blower housing 1 (see FIG. 4). In this position of the filter element support 24, the accessibility of the filter elements 21 is significantly improved which makes the servicing process (exchange of the filter elements) more comfortable. In the embodiments illustrated in FIG. 3 to FIG. 6, the axis S extends along the vertical axis. However, axes of rotation that are deviating therefrom in other embodiments as well as a linear displacement of the filter element support 24 are also encompassed by the invention (compare FIGS. 9a, 9b, and 10).

In embodiments that are not shown in the Figures, the filter element support 24 can also be locked in its servicing state relative to the blower housing. For this purpose, a second locking device can be used which can be constructed optionally in analogy to the first locking device.

Figure 5:
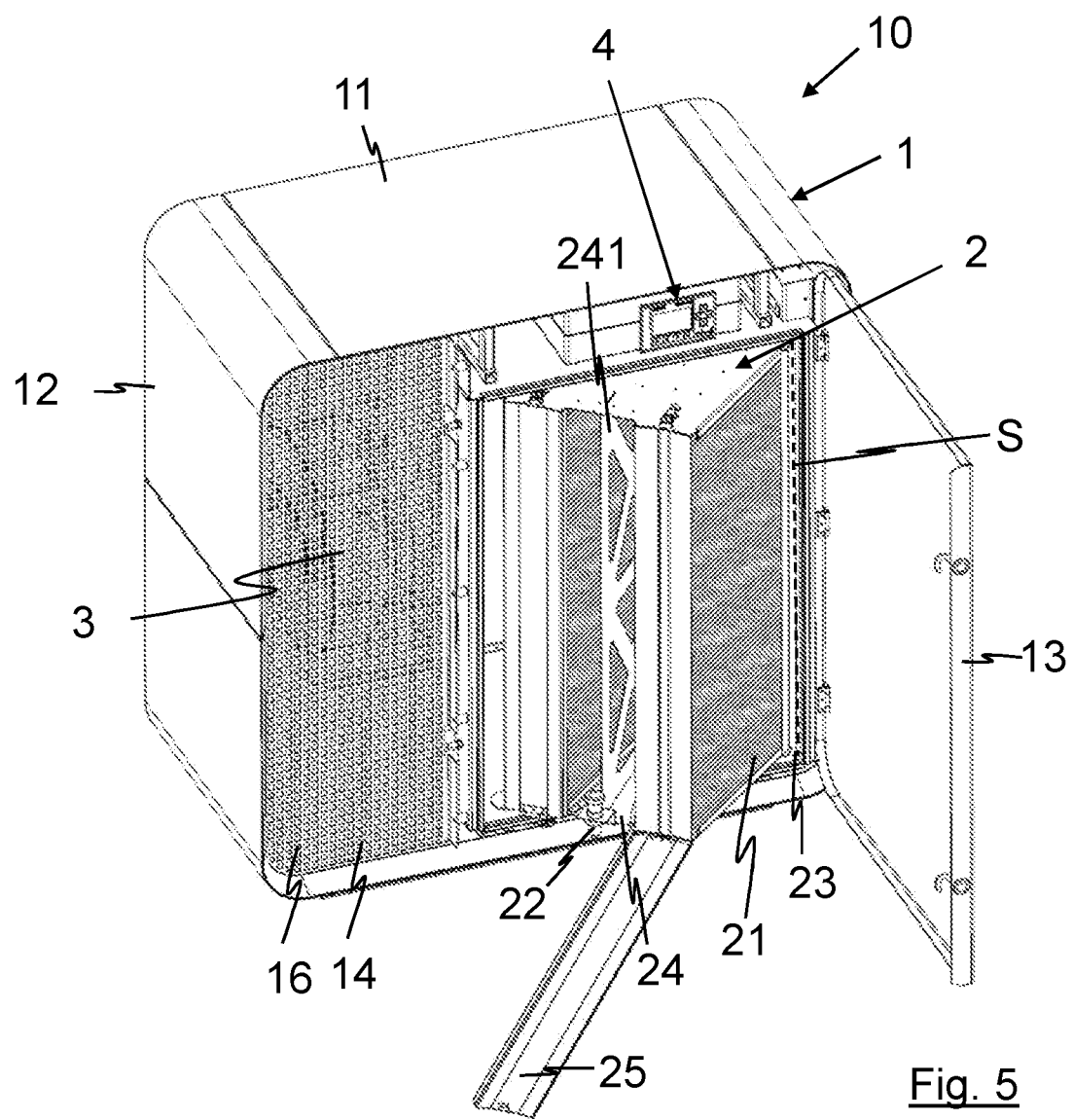
FIG. 5 shows in isometric illustration a third step of servicing the ambient air purifying device according to the invention.
Figure 6:
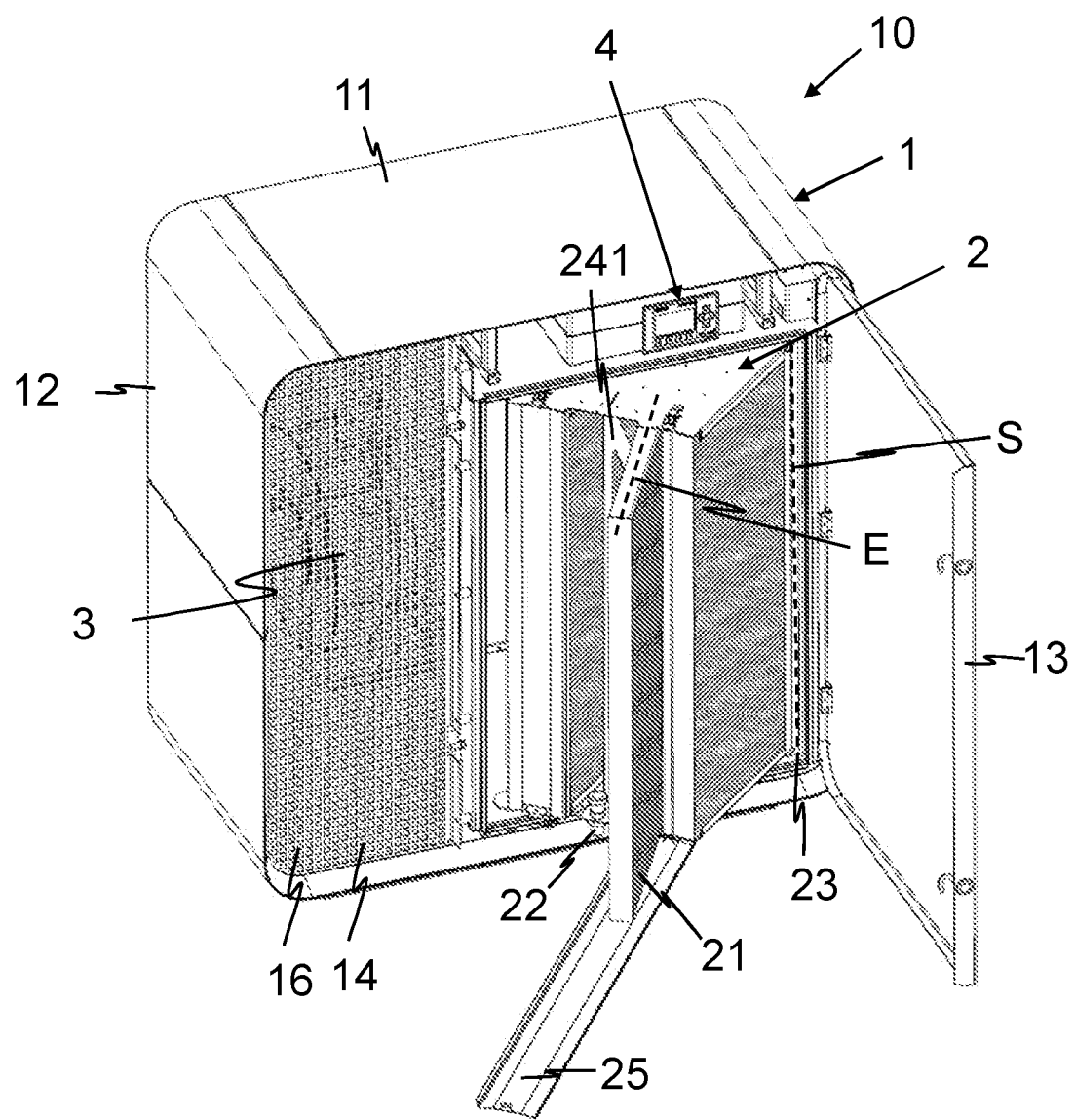
FIG. 6 shows in isometric illustration a fourth step of servicing the ambient air purifying device according to the invention.

In FIG. 5, the next step for filter element servicing is illustrated. Beginning with the filter element support 24 in the servicing state (pivoted out of the servicing door 13), at the filter elements 21 that are to be exchanged the filter element holding device 25 is released and folded away (in downward direction). The filter element holding device 25 is fastened with one end (bottom) pivotably at the body of the filter element support and with the other end (top) detachably at the body of the filter element support 24. In the folded-in state (operating state), the filter element holding device 25 holds one or a plurality of filter element(s) 21 in its filter element inserts 241. In the folded-out servicing state of the filter element holding device 25, the filter element(s) 21 can be removed along an insertion/removal direction E from the respective filter element insert 241; this is illustrated in FIG. 6.

In embodiments, it can be provided that the filter element holding device 25 in its servicing state is lockable in a horizontal position so that the filter element holding device 25 serves as a removal aid for the filter element 21 and supports it relative to the force of gravity.

Figure 7:
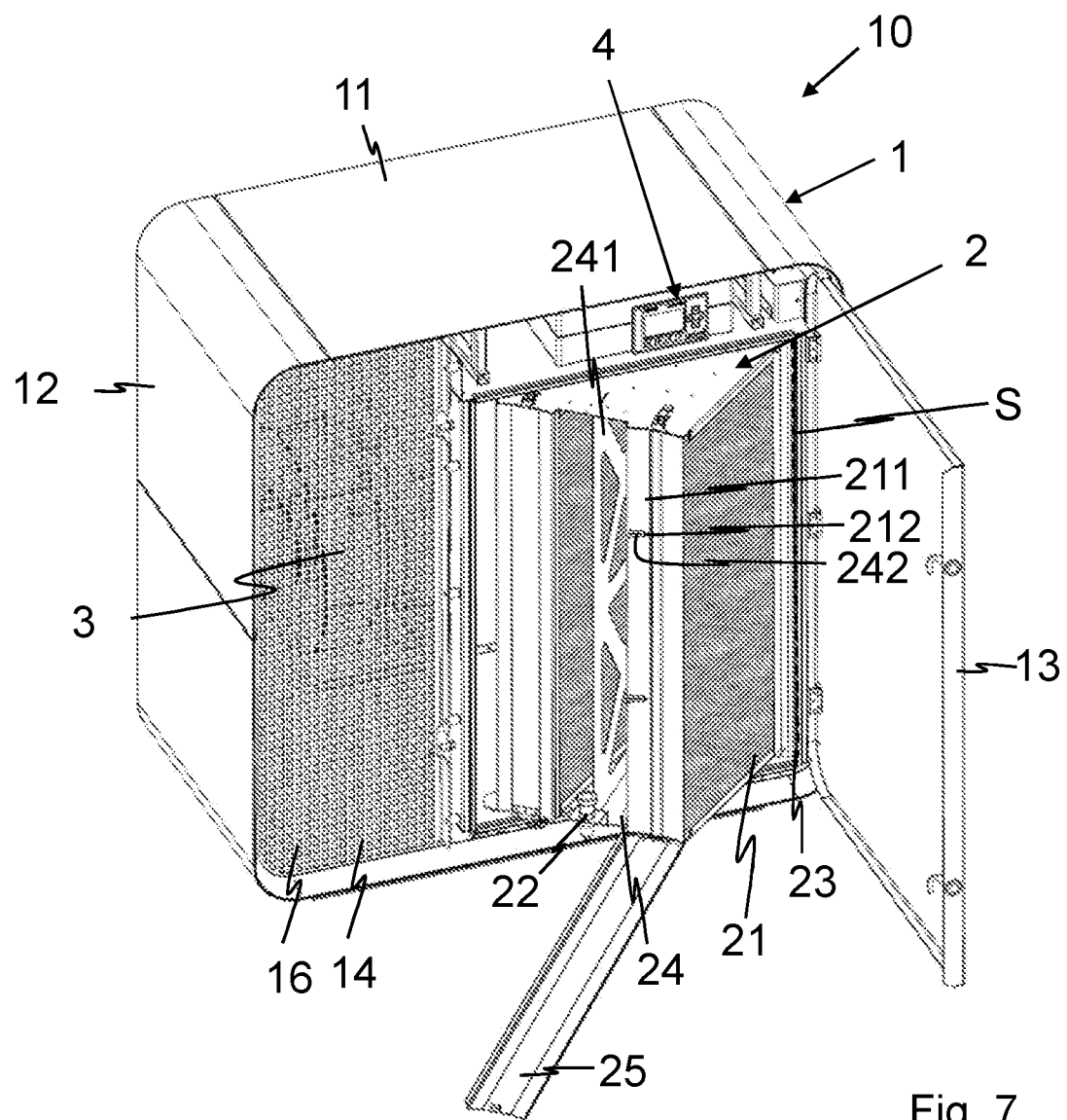
FIG. 7 shows an isometric illustration of a further embodiment of the ambient air purifying device according to the invention.

In FIG. 7, an ambient air purifying device 10 according to a further embodiment is illustrated wherein the filter element support 24 is in its servicing state. This embodiment differs from the embodiment illustrated in FIG. 3 to FIG. 6 in that the at least one filter element 21 comprises a frame 211 which surrounds a folded bellows of folded filter medium, wherein in the frame at least one (here two) cuts 212 are provided extending away from a rim. The cuts 212 are positioned respectively between two neighboring folds of the folded bellows. A rib 242 which is provided at the filter element support 24 is received in the cuts 212, respectively.

The rib 242 extends in this context between the two neighboring folds of the folded bellows of filter medium. The rib 242 can be present as an elongate flat component at the filter element support 24 and, for example, can be comprised of metal, for example, steel. The rib 242 in this case can be detachably or non-detachably fastened to the body of the filter element support 24, for example, welded. The functional interaction of the rib 242 at the filter element support 24 and of the cut 212 at the filter element 21 enables an additional simplification of mounting because the rib 242, by its engagement in the cut 212, fulfills a supporting and positioning function. Moreover, in this way a faulty mounting of the filter element 21 can be avoided (poka-yoke) as well as the installation of unsuitable filter elements (e.g. wrong specification) can be prevented. Also, oppositely positioned cuts 212 at oppositely positioned frame sides, respectively, can be provided, in particular in the lateral tapes of the frame. In this case, the filter element 21, along its complete mounting path along the insertion/removal direction E (see FIG. 6), can be guided by the engagement of the rib 242 in the cut 212.

Figure 8A:
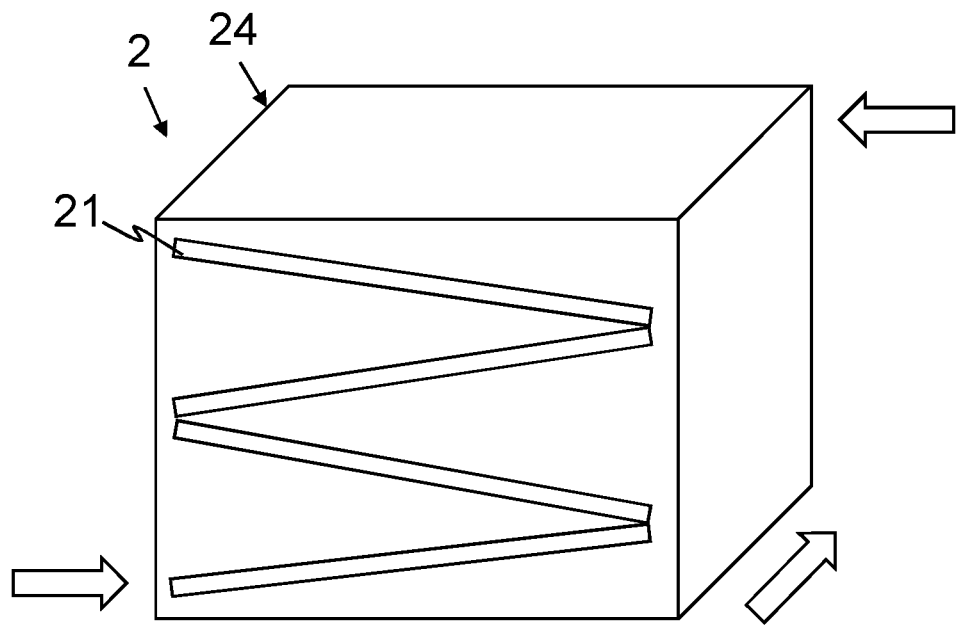
FIG. 8a and FIG. 8b show schematic illustrations of a filter element support of the ambient air purifying device according to the invention.
Figure 8B:
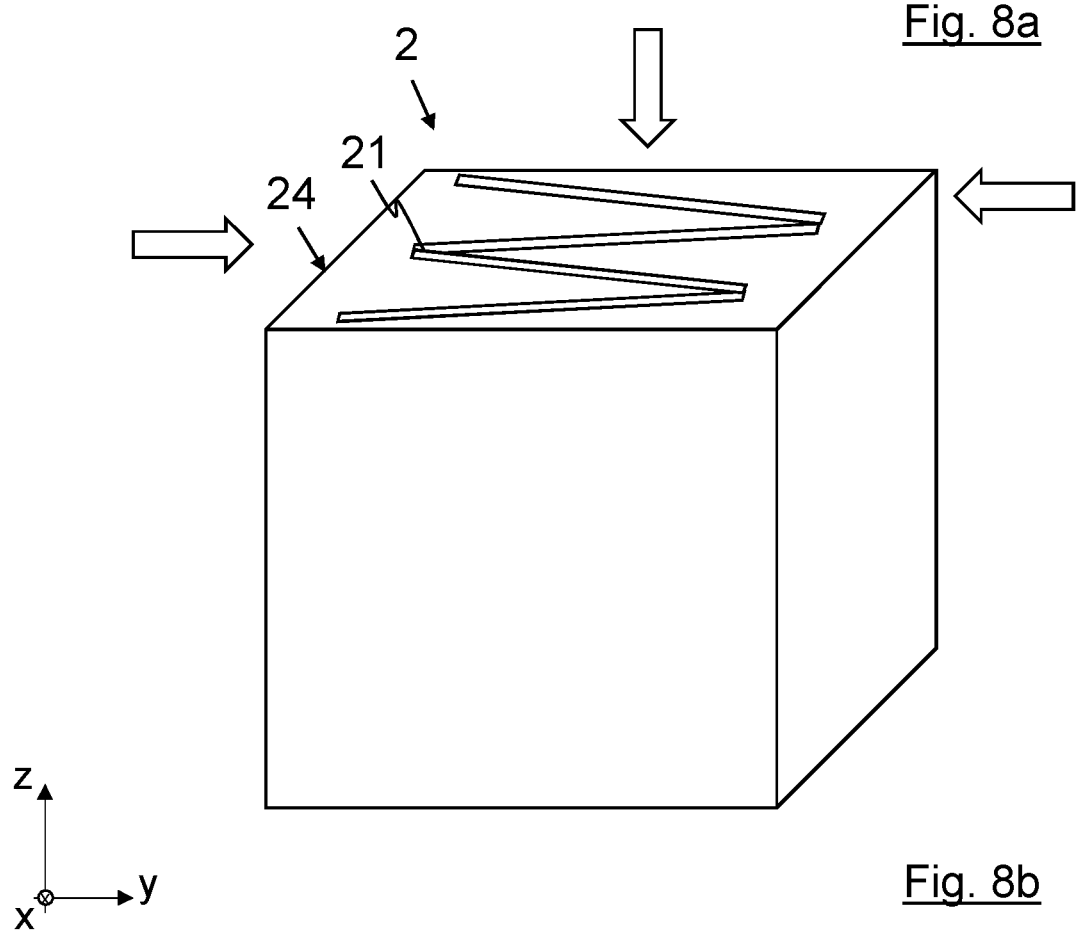

In FIGS. 8a, 8b, schematically further possible orientations of the insertion/removal direction of the filter element are illustrated. The "cube" represents the filter element support 24 in which a plurality of filter elements 21 in V shape are arranged. The insertion/removal direction of the filter elements can extend along the directions indicated by arrows. In the employed coordinate system, the z direction is the vertical axis for intended mounting of the filter element 24. Defined insertion/removal directions are suitable in this context particularly well for a combination with a blower housing that comprises a servicing door at one of the side walls or at an upper and/or lower wall or at a front or rear wall. Depending on the boundary conditions of use, an advantageous combination of the arrangement of the servicing door at the blower housing and of a defined insertion/removal direction of the filter elements is to be selected. In this context, decisive for a selection is not least the installation location (accessibility of the servicing door, mounting height of the ambient air purifying device etc.).

Figure 9A:
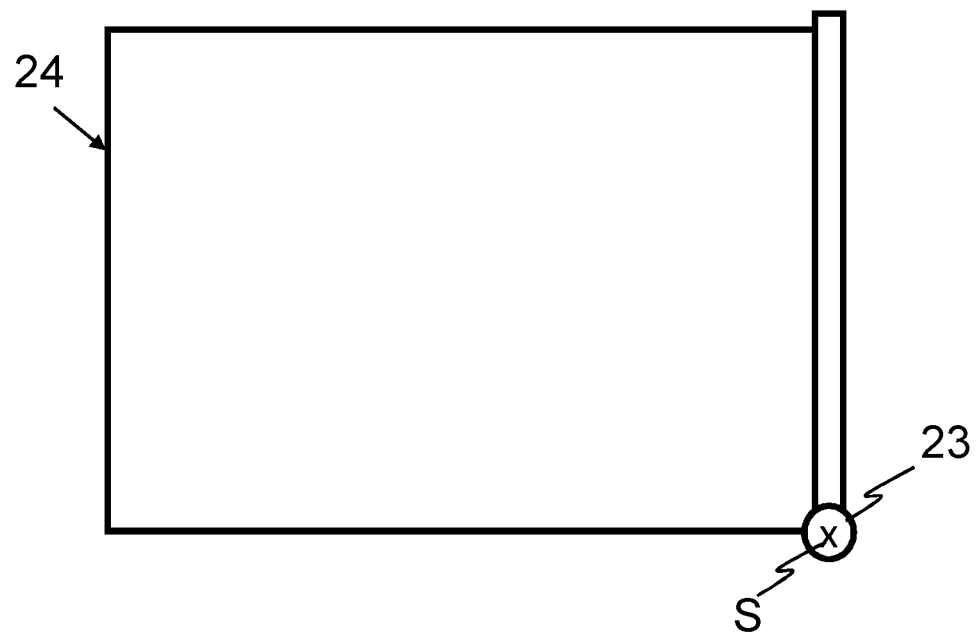
FIG. 9a and FIG. 9b show schematic illustrations of pivot axes of the filter element support of the ambient air purifying device according to the invention.
Figure 9B:
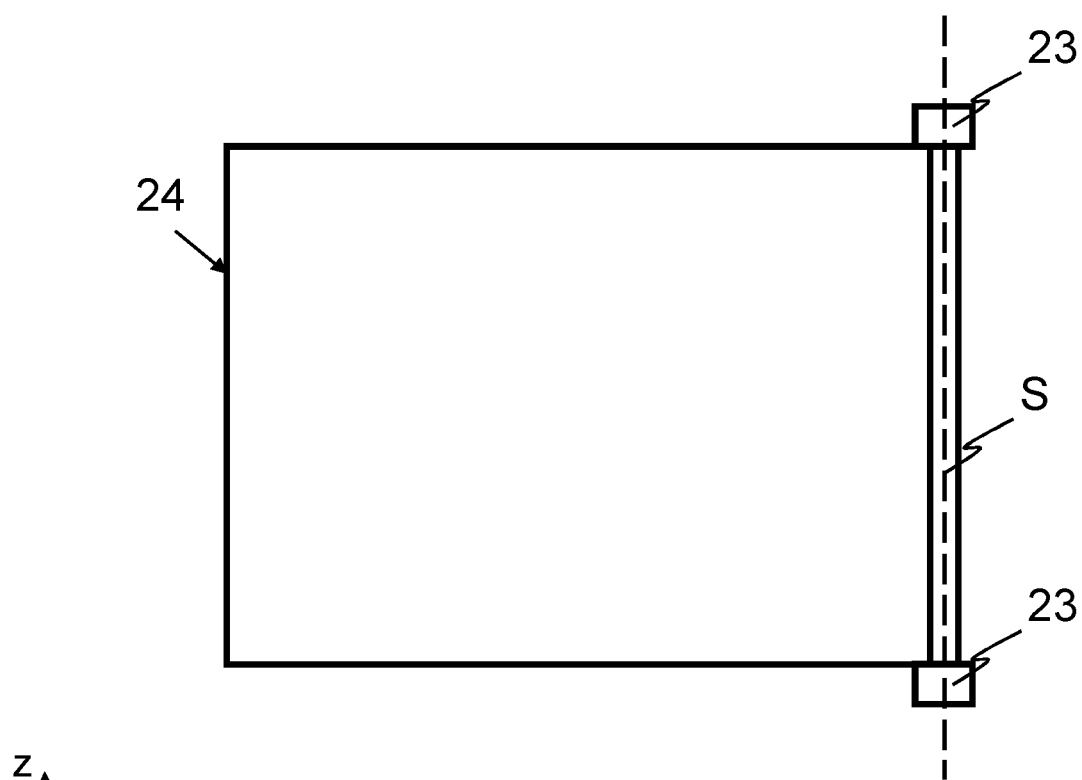

In FIGS. 9a, 9b, two further alternatives for orientation of the pivot axis S of the joint 23 with which the filter element support is supported at the blower housing are illustrated. In this context, the z direction is again the vertical axis for intended mounting of the filter element support 24.

Figure 10:
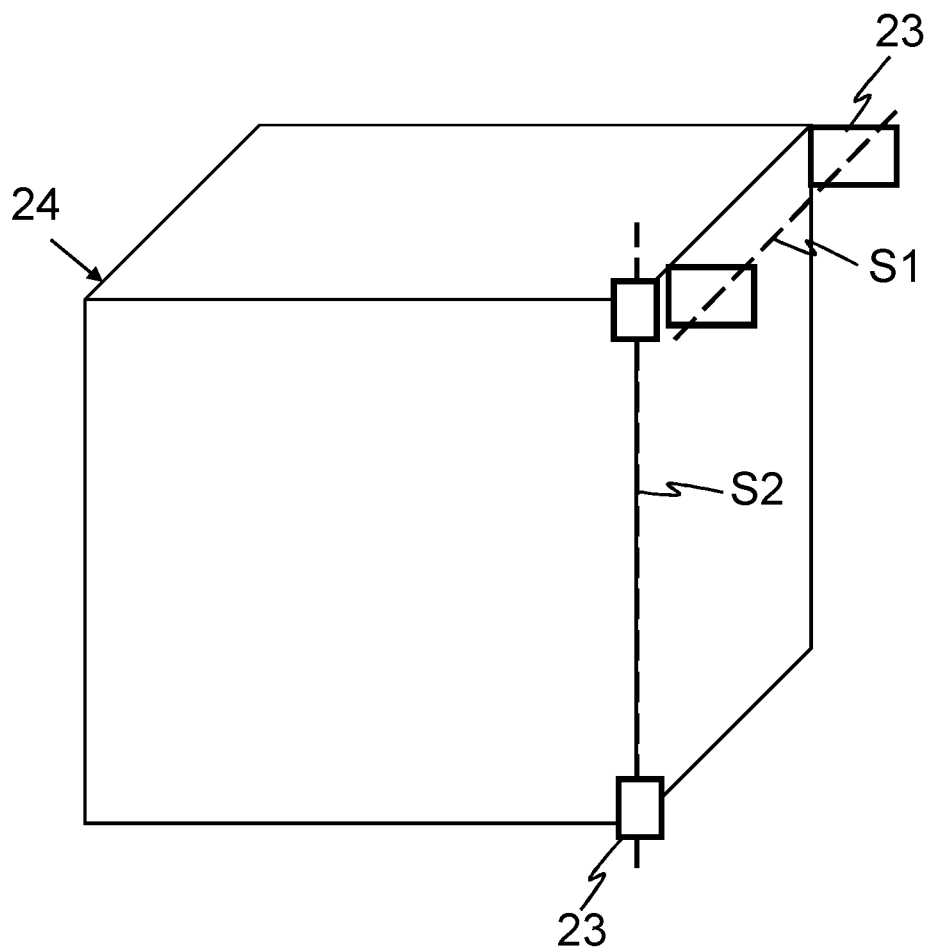
FIG. 10 shows a further embodiment of a pivoting action of the filter element support about two axes.
Figure 10:
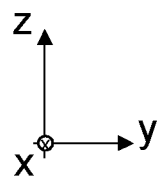

In FIG. 10, as a further embodiment a pivoting action of the filter element support 24 about two axes S1, S2 is illustrated, wherein the z direction in this context is again the vertical axis for intended mounting of the filter element support 24. In this context, for example, first a linear pull-out along the axis S1 can be realized, then pivoting about axis S2, and subsequently pivoting about axis S2 to transfer the filter element support 24 into its servicing state. In other embodiments of the invention which are not illustrated in the Figures, other combinations of rotational and linear movement axes may be employed also.

LIST OF REFERENCE CHARACTERS 10 ambient air purifying device
1 blower housing
11 upper/lower wall of the blower housing
12 side walls of the blower housing
13 servicing door
14 air outlet
15 air inlet
16 grid 2 filter device
21 filter element
211 frame
212 cut
22 locking device
23 joint; hinge
24 filter element support
241 filter element insert
242 rib
25 filter element holding device
3 air flow generating device
4 control unit
E insertion/removal direction of the filter element
S, S1, S2 pivot axis of the filter element support

What is claimed is:

1. An ambient air purifying device comprising:
a blower housing comprising an air inlet and an air outlet;
at least one air flow generating device arranged in the blower housing and configured to generate an air flow from the air inlet to the air outlet;
a filter device arranged in the blower housing between the air inlet and the air outlet in regard to flow and comprising a plurality of filter elements arranged in a V shape relative to each other;
the blower housing comprising a servicing door configured to provide access to an interior of the blower housing;
the filter device comprising a filter element support held at the blower housing and supporting the filter elements that are arranged in a V shape relative to each other;
the filter element support configured to be transferred from an operating state, in which the filter element support is arranged completely inside the blower housing, into a servicing state, in which the filter element support projects at least partially through the servicing door from the blower housing;
the filter element support pivotably supported about at least one pivot axis in relation to the blower housing, wherein a transfer of the filter element support from the operating state into the servicing state and from the servicing state into the operating state comprises a pivoting action about the at least one pivot axis.

2. The ambient air purifying device according to claim 1, wherein the at least one pivot axis of the filter element support extends in a vertical direction or in a horizontal direction in relation to the blower housing in a predetermined operating orientation of the ambient air purifying device.

3. The ambient air purifying device according to claim 1, wherein the at least one pivot axis of the filter element support extends in a vertical direction and in a horizontal direction in relation to the blower housing in a predetermined operating orientation of the ambient air purifying device.

4. The ambient air purifying device according to claim 1, wherein the filter element support is coupled to the blower housing by at least one joint comprising at least one rotational degree of freedom.

5. The ambient air purifying device according to claim 1, further comprising a locking device configured to lock the filter element support in relation to the blower housing in the operating state and/or in the servicing state.

6. The ambient air purifying device according to claim 5, wherein the locking device comprises a first part arranged at the filter element support and further comprises a second part arranged at the blower housing.

7. The ambient air purifying device according to claim 5, wherein the locking device comprises at least one spring-loaded locking element.

8. The ambient air purifying device according to claim 1, wherein a length extension of a plurality of the filter elements arranged in a V shape relative to each other extends in a vertical direction in a predetermined operating orientation of the ambient air purifying device.

9. The ambient air purifying device according to claim 1, wherein the filter element support comprises a plurality of filter element inserts, wherein each filter element insert receives one of the filter elements and is configured such that the respective filter element is removable along an insertion/removal direction (E).

10. The ambient air purifying device according to claim 9, wherein the filter element support comprises at least one filter element holding device and the at least one filter element holding device mechanically fixes one or more of the filter elements arranged in an inserted state in the filter element support in relation to the filter element support.

11. The ambient air purifying device according to claim 10, wherein the at least one filter element holding device is configured to be transferred into a servicing state in which the at least one filter element holding device is displaced relative to a body of the filter element support and serves as a pull-out aid for the one or more filter elements that are mechanically fixed by the at least one filter element holding device in the inserted state.

12. The ambient air purifying device according to claim 9, wherein at least one of the filter elements comprises a folded bellows of a folded filter medium.

13. The ambient air purifying device according to claim 12, wherein a fold length extension of the folded bellows extends parallel to the insertion/removal direction.

14. The ambient air purifying device according to claim 12, wherein the at least one of the filter elements comprises a frame surrounding the folded bellows circumferentially, wherein the frame comprises a cut extending from an upper rim or a lower rim of the frame into the frame and arranged between two neighboring folds of the folded bellows.

15. The ambient air purifying device according to claim 14, wherein the filter element support comprises at least one rib extending in the insertion/removal direction and arranged in a region of at least one of the plurality of filter element inserts, wherein the at least one rib engages the cut of the filter element and is received between the two neighboring folds of the folded bellows.

16. The ambient air purifying device according to claim 15, wherein the at least one rib comprises a length corresponding to at least 1/10 of an extension of the filter element measured along a fold length direction.

17. The ambient air purifying device according to claim 1, wherein the blower housing comprises: a front wall and a rear wall positioned opposite each other; side walls positioned opposite each other and connecting the front wall and rear wall to each other; and an upper wall and a lower wall positioned opposite each other and connected to the front wall, the rear wall, and the side walls.

18. The ambient air purifying device according to claim 17, wherein the air outlet is arranged in the front wall or the rear wall, and wherein the air inlet is arranged in one of the side walls.

19. The ambient air purifying device according to claim 18, wherein an air flow flowing from the air inlet to the air outlet comprises a main flow direction, wherein the air flow experiences at least one directional change of the main flow direction between the air inlet and the air outlet.

20. A method of using a filter element comprising a folded bellows of folded filter medium and further comprising a frame surrounding the folded bellows circumferentially, wherein the frame comprises at least one cut extending from an upper rim and/or a lower rim of the frame into the frame and arranged between two neighboring folds of the folded bellows, the method comprising providing an ambient air purifying device according to claim 1 and installing the filter element in the filter device of the ambient air purifying device.

21. The method according to claim 20, providing the filter element with a fold length extension of the folded bellows parallel to an insertion/removal direction of the filter element.

\* \* \* \* \*